United States Patent
Davidson et al.

(10) Patent No.: US 8,230,493 B2
(45) Date of Patent: Jul. 24, 2012

(54) ALLOWING DIFFERENTIAL PROCESSING OF ENCRYPTED TUNNELS

(75) Inventors: Kenneth W. Davidson, Frisco, TX (US); Louis F. Menditto, Raleigh, NC (US); Gopal K. Dommety, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1297 days.

(21) Appl. No.: 11/799,943

(22) Filed: May 2, 2007

(65) Prior Publication Data
US 2008/0276085 A1 Nov. 6, 2008

(51) Int. Cl.
*H04L 29/06* (2006.01)
(52) U.S. Cl. .......................................... 726/15; 713/162
(58) Field of Classification Search .................... 726/11, 726/12, 13, 14, 15; 713/151, 152, 153, 154, 713/160, 161, 162, 164, 189, 190, 191; 370/230, 370/352, 389
See application file for complete search history.

(56) References Cited

U.S. PATENT DOCUMENTS

| | | | |
|---|---|---|---|
| 7,062,566 B2 | 6/2006 | Amara et al. | |
| 7,623,458 B2 * | 11/2009 | Ayyagari et al. | 370/235 |
| 2003/0189935 A1 * | 10/2003 | Warden et al. | 370/395.21 |
| 2003/0235209 A1 * | 12/2003 | Garg et al. | 370/468 |
| 2004/0123139 A1 | 6/2004 | Aiello et al. | |
| 2004/0225895 A1 | 11/2004 | Mukherjee et al. | |
| 2005/0088977 A1 * | 4/2005 | Roch et al. | 370/254 |
| 2005/0169253 A1 * | 8/2005 | Hu | 370/352 |

* cited by examiner

*Primary Examiner* — Gilberto Barron, Jr.
*Assistant Examiner* — Izunna Okeke
(74) *Attorney, Agent, or Firm* — Patent Capital Group (57) ABSTRACT

In one embodiment, a method can include: (i) receiving an outbound packet in a network device, where the outbound packet includes a packet header; (ii) modifying the outbound packet by adding a service identifier to a cleartext portion of the packet header; (iii) when the outbound packet represents an event boundary, adding an event delimiter to the packet header; and (iv) passing the outbound packet to an encryption process for packaging and transmitting across a tunnel.

15 Claims, 7 Drawing Sheets

ALLOWING DIFFERENTIAL PROCESSING OF ENCRYPTED TUNNELS

TECHNICAL FIELD

The present disclosure relates generally to differential processing of encrypted tunnels, such as Internet protocol (IP) security, or IPsec.

BACKGROUND

Using conventional approaches, it may not be possible for network devices to differentiate transactions within IP security (IPsec), or other encrypted tunnels. Thus, the network may not apply differential processing, such as charging or quality of service (QoS) to various transactions passing through such tunnels.

Instead, network processing rules in conventional approaches may simply be applied in aggregate for such a tunnel. However, these conventional approaches may not allow for transaction awareness suitable for differential processing.

DESCRIPTION OF EXAMPLE EMBODIMENTS

Overview

In one embodiment, a method can include: (i) receiving an outbound packet in a network device, where the outbound packet includes a packet header; (ii) modifying the outbound packet by adding a service identifier to a cleartext portion of the packet header; (iii) when the outbound packet represents an event boundary, adding an event delimiter to the packet header; and (iv) passing the outbound packet to an encryption process for packaging and transmitting across a tunnel.

In one embodiment, a method can include: (i) receiving a packet in a network device, where the packet is encrypted, and the packet includes a packet header; (ii) accessing an unencrypted service identifier in the packet header; and (iii) applying service control and charging logic to the packet using the unencrypted service identifier.

In one embodiment, an apparatus can include: (i) logic encoded in one or more tangible media for execution, and when executed operable receive an outbound packet in a network device, the outbound packet having a packet header; (ii) logic encoded in one or more tangible media for execution, and when executed operable modify the outbound packet by adding a service identifier to a cleartext portion of the packet header; (iii) logic encoded in one or more tangible media for execution, and when executed operable to add an event delimiter to the packet header when the outbound packet represents an event boundary; and (iv) logic encoded in one or more tangible media for execution, and when executed operable pass the outbound packet to an encryption process for packaging and transmitting across a tunnel.

In one embodiment, an apparatus can include: (i) logic encoded in one or more tangible media for execution, and when executed operable to receive a packet, where the packet is encrypted and the packet includes a packet header; (ii) logic encoded in one or more tangible media for execution, and when executed operable to access an unencrypted service identifier in the packet header; and (iii) logic encoded in one or more tangible media for execution, and when executed operable to apply service control and charging logic to the packet using the unencrypted service identifier.

Example Embodiments

In particular embodiments, Internet protocol (IP) or other suitable traffic can be observed and classified or differentiated based on designated criteria. For example, data to be accessed or files to be downloaded can be considered as criteria. Such differentiation of traffic can allow for service providers to charge different rates for different types of traffic, even for traffic involving packets in encrypted form. Further, mobile networks, or any other suitable type of network, can be configured for traffic differentiation in particular embodiments.

Figure 1:
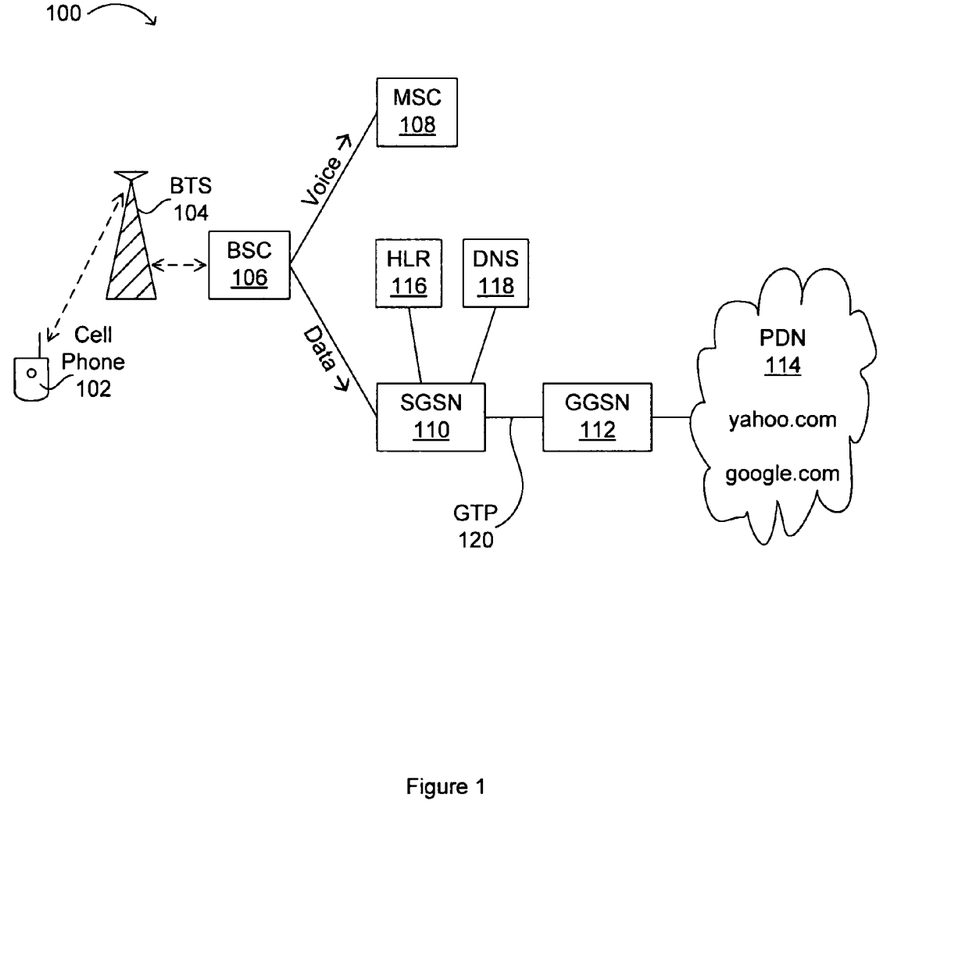
FIG. 1 illustrates an example general packet radio service (GPRS) network.

Referring now to FIG. 1, an example general packet radio service (GPRS) network is shown and indicated by the general reference character 100. Such a mobile network can employ universal mobile telecommunications system (UMTS) 2.5 GHz and/or 3 GHz standards, for example. Cell phone 102 calls can be received/transmitted by Base Transceiver Station (BTS) 104, which can interface with Base Station Controller (BSC) 106. If a call from cell phone 102 is a voice call, it can be routed to Mobile Switching Center (MSC) 108. However, if the call is a data call, it can be routed to Serving GPRS Support Node (SGSN) 110. Gateway GPRS Support Node (GGSN) 112 can be a server and/or part of a switch/router, and may represent a point of attachment or "gateway," for example. Cell phone 102 can be any device (e.g., a laptop, handset, or another type of phone) that can access the Internet (e.g., Public Data Network (PDN) 114).

IP services that can be supplied to a mobile user of cell phone 102 can include services available via GGSN 112, such as quality of service (QoS), IP address allocation, security, policy, and billing/charging. Further, SGSN 110 can provide wireless service control for a user (e.g., a user of cell phone 102). Such service control can include a user profile via Home Location Registry (HLR) 116 and/or Domain Name Service (DNS) 118. Once a user connection is established, the user information can be retrieved from a database stored on HLR 116. For example, a determination of the types of service that a particular user is authorized to utilize can occur in this fashion. Further, other parameters can also be supplied, such as QoS profile, access mode, and/or Access Point Name (APN). An APN is essentially a logical name referring to a GGSN and an external network.

Cell phone 102 can have a user initially identified by IMSI (International Mobile Subscriber Identifier). With such information, SGSN 110 can retrieve the appropriate subscriber information for this user (e.g., an APN that the user is attempting to access from PDN 114). Such an APN may be provided via one server coupled to an actual web site (e.g., yahoo.com or google.com) that the user wishes to access. To facilitate this accessing, SGSN 110 can determine which of several possible GGSNs (e.g., GGSN 112) should be utilized for the connection. Each such GGSN may be able to support a subset of all APNs or other local settings and/or configurations of the APNs allocated to a particular GGSN, for example.

GPRS Tunneling Protocol (GTP) 120 can be used to set up a user connection between SGSN 110 and GGSN 112. Among the parameters in GTP 120 are Mobile Service IP (MSIP) address, QoS, access mode, and billing/charging characteristics, to name just a few. In one embodiment, this parameter information can be stored in GGSN 112. In operation, when SGSN 110 receives an activation or access request (e.g., initiated via cell phone 102), SGSN 110 can pass such associated GTP 120 to GGSN 112. The parameter information can be stored in GGSN 112 as part of a Packet Data Protocol (PDP), which can be a GTP session or context for each user.

Of course, any appropriate network can be utilized in particular embodiments. For example, any mobile network, such as code division multiple access (CDMA) or other mobile networks, can be utilized. Also, any type of non-mobile networks can also be used in particular embodiments. Further, any suitable combination of different network types (e.g., mobile and non-mobile) can be utilized in particular embodiments. For example, networks suitable for use in particular embodiments can include GPRS, UMTS, CDMA, circuit switched dial, wireless local area networks (WLAN), and worldwide interoperability for microwave access (WiMAX), just to name a few.

Figure 2:
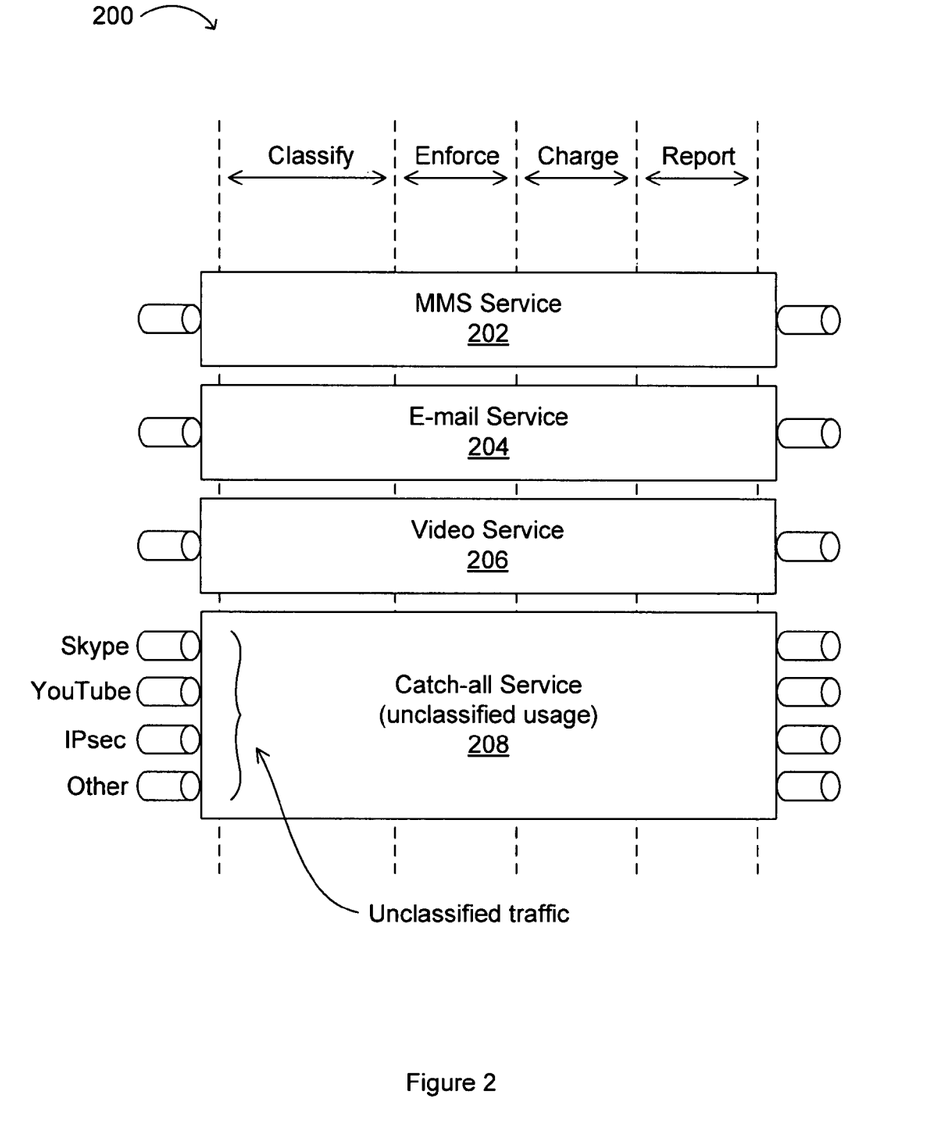
FIG. 2 illustrates an example of classified and unclassified traffic usage.

Referring now to FIG. 2, an example of classified and unclassified traffic usage is shown and indicated by the general reference character 200. Incoming traffic can be classified, enforcement can be applied, charging can be accommodated, and a report or other tangible result can be provided. Such operations can occur in a classification engine, a client or a server, and/or a router. Some services may generally be classified, such as multimedia messaging service (MMS) service 202, general e-mail service 204, and video service 206. Accordingly, a service provider can utilize this classification to charge different rates for different services.

On the other hand, some services may be "catch-all" type services, and may not typically be classified. For example, Skype, YouTube, IP security (IPsec), and other such services may be catch-all services 208 and can represent unclassified usage. As a result, unclassified traffic may only be charged by a service provider at a generic bandwidth rate, resulting in lost potential for capturing revenue as a high-value service.

Figure 3:
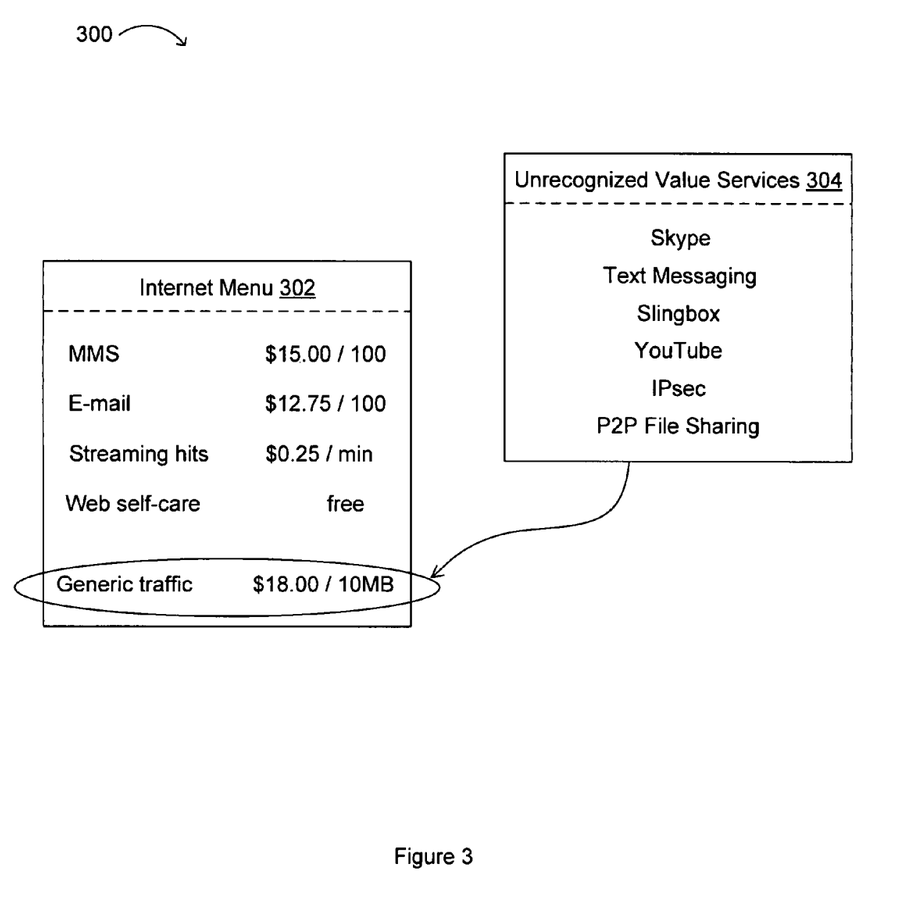
FIG. 3 illustrates an example of typically unrecognized value services.

Referring now to FIG. 3, an example of typically unrecognized value services is shown and indicated by the general reference character 300. Types of Internet services, and charges therefor, can be characterized as an Internet menu 302. For example, MMS may be charged as $15 per 100 messages, e-mail may be charged as $12.75 per 100 e-mails, streaming hits may be charged as $0.25 per minute, and Web self-care may be free of charge. However, generic traffic may be charged at a flat rate of $18 per 10 MB of traffic.

Because of typical generic traffic pricing as shown, unrecognized services having enhanced value may be priced below this value, resulting in lost potential revenue for service providers. Such unrecognized value services 304 can include Skype, text messaging (e.g., instant messaging (IM)), Slingbox, YouTube, IPsec, and peer-to-peer (P2P) file sharing, as just a few examples. Further, some such unrecognized value services may compete with traditional value services, such as Skype versus voice, and IM versus short message service (SMS).

Generally by nature, encrypted tunnels may be substantially invisible to intervening network devices. In particular embodiments, a transaction or "event" delimiter and a service identifier can be exposed to allow for interpretation by network-based control devices. Such interpretation can allow for enforcement of service provider policies, such as charging and QoS. Thus in particular embodiments, awareness of transactions within tunnels may be provided such that differential processing can be applied on the transactions.

In particular embodiments, network control devices can use the transaction delimiter and service identifier, or other suitable identifiers, for a variety of applications. For example, particular embodiments can enable event-based charging for a single service. As another example, a charging mechanism can be coupled with the service identifier to enable differential charging for each of the transactions based on the service that is identified for each.

In particular embodiments, a transaction delimiter and a service identifier may be transmitted outside of an encrypted portion of the tunnel data flow. For example, these identifiers can be inserted either by a client, or a server, or both. Also in particular embodiments, a choice as to which end of a path inserts these identifiers may depend on which endpoint is trusted by the service provider. Service providers that provide their own trusted client may be able to trust information from that client, while others may prefer server-based token management, or an appropriate hybrid approach.

In particular embodiments, identifiers or tokens inserted by tunnel endpoints or suitable network devices may be visible to network-based control devices (e.g., for a service provider), and may also be used for differential processing, such as charging and/or QoS. Devices configured to provide or insert identifiers in particular embodiments can include clients and/or servers, or any suitable network device (e.g., a router including "sniffing" applications) or tunnel endpoint. One example of a tunnel endpoint is a virtual private network (VPN) client.

Figure 4:
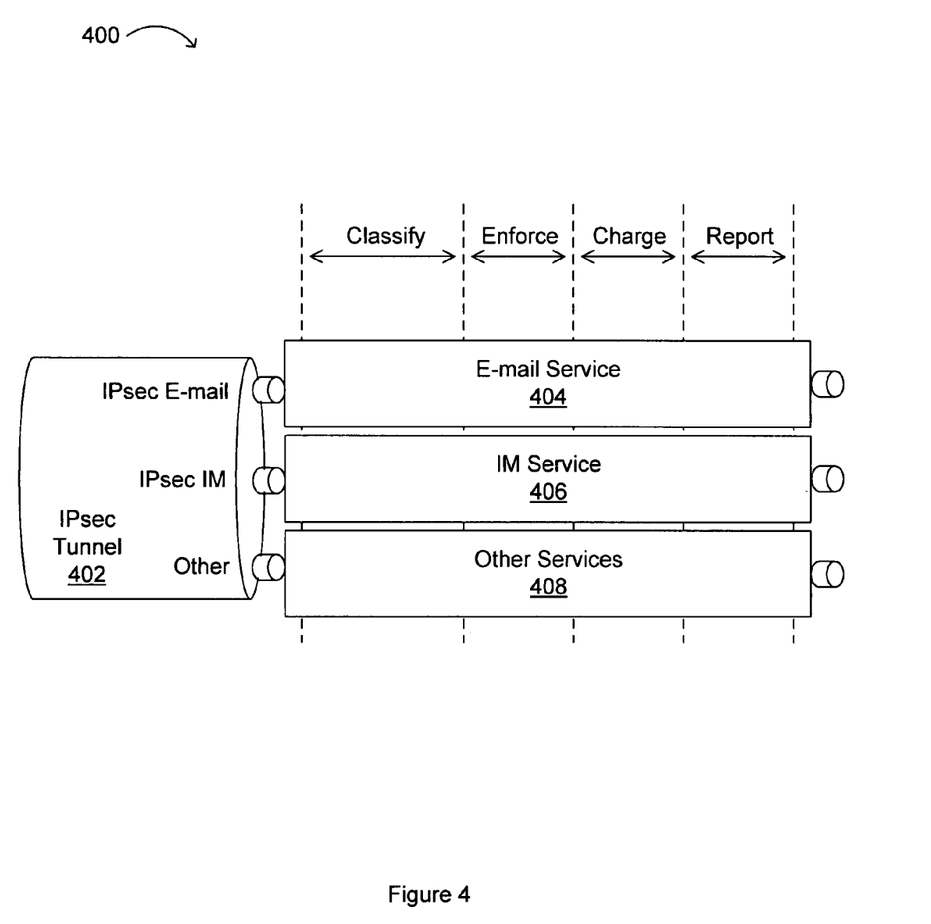
FIG. 4 illustrates an example IPsec tunnel for service differentiation.

Referring now to FIG. 4, an example IPsec tunnel for service differentiation is shown and indicated by the general reference character 400. Differentiation of services within IPsec tunnel 402 can allow for variable charging and application-specific QoS. For example, IPsec tunnel 402 can support differentiation of IPsec e-mail traffic, which can be provided to e-mail service 404, and charged per sent e-mail. Also, IPsec tunnel 402 can support differentiation of IPsec IM traffic, which can be provided to IM service 406, and charged per message. Further, other types of traffic can be routed via IPsec tunnel 402 to other services 408, with associated bulk charging. In this fashion, higher-value services can have an associated increased charge therefor.

Figure 5:
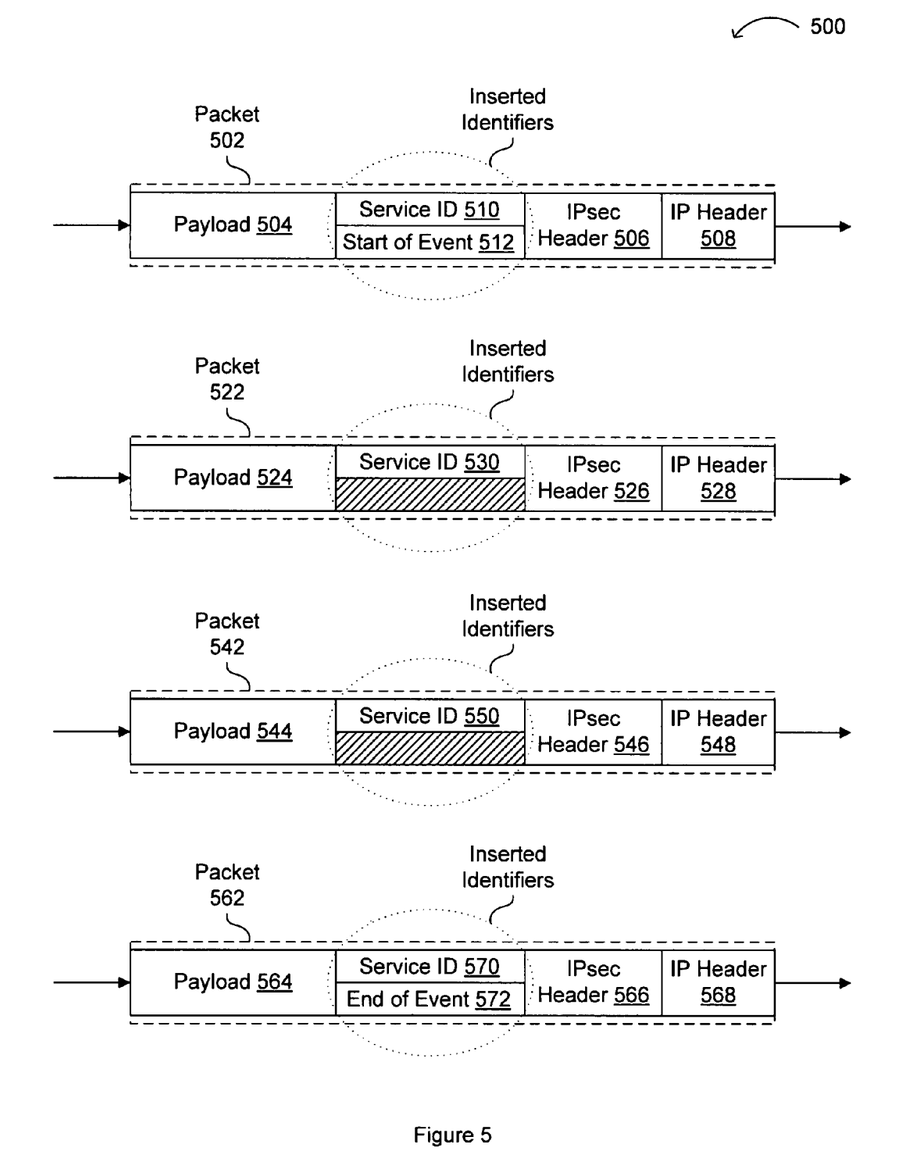
FIG. 5 illustrates an example packet sequence.

Referring now to FIG. 5, an example packet sequence is shown and indicated by the general reference character 500. Packet 502 can include payload 504, IPsec header 506, and IP header 508. In addition, identifiers can be inserted for service differentiation. For example, service ID 510, and start of event indication 512, can be added to packet 502, where an event or transaction can span multiple packets. Similarly, packet 522 can include payload 524, IPsec header 526, IP header 528, and inserted identifier service ID 530. For packet 522, because the packet is not an event delimiter, such as representing a beginning or ending of an event, only service ID 530 may be inserted to appropriately differentiate a particular service.

Packet 542 can also include payload 544, IPsec header 546, IP header 548, and service ID 550 as an inserted identifier. Packet 562 can include payload 564, IPsec header 566, and IP header 568. Further, packet 562 can represent an end of an event or transaction. Accordingly, inserted identifiers into packet 562 can include service ID 570 and end of event indication 572. Further, such identifiers may be inserted into a packet header, such as in a "cleartext" portion of the packet header. For example, the cleartext portion of a packet header may be outer IP and transmission control protocol (TCP) headers, or a VPN encapsulation header. In this fashion, services can be differentiated by inserting service identifiers and event boundary indications, where appropriate.

Figure 6:
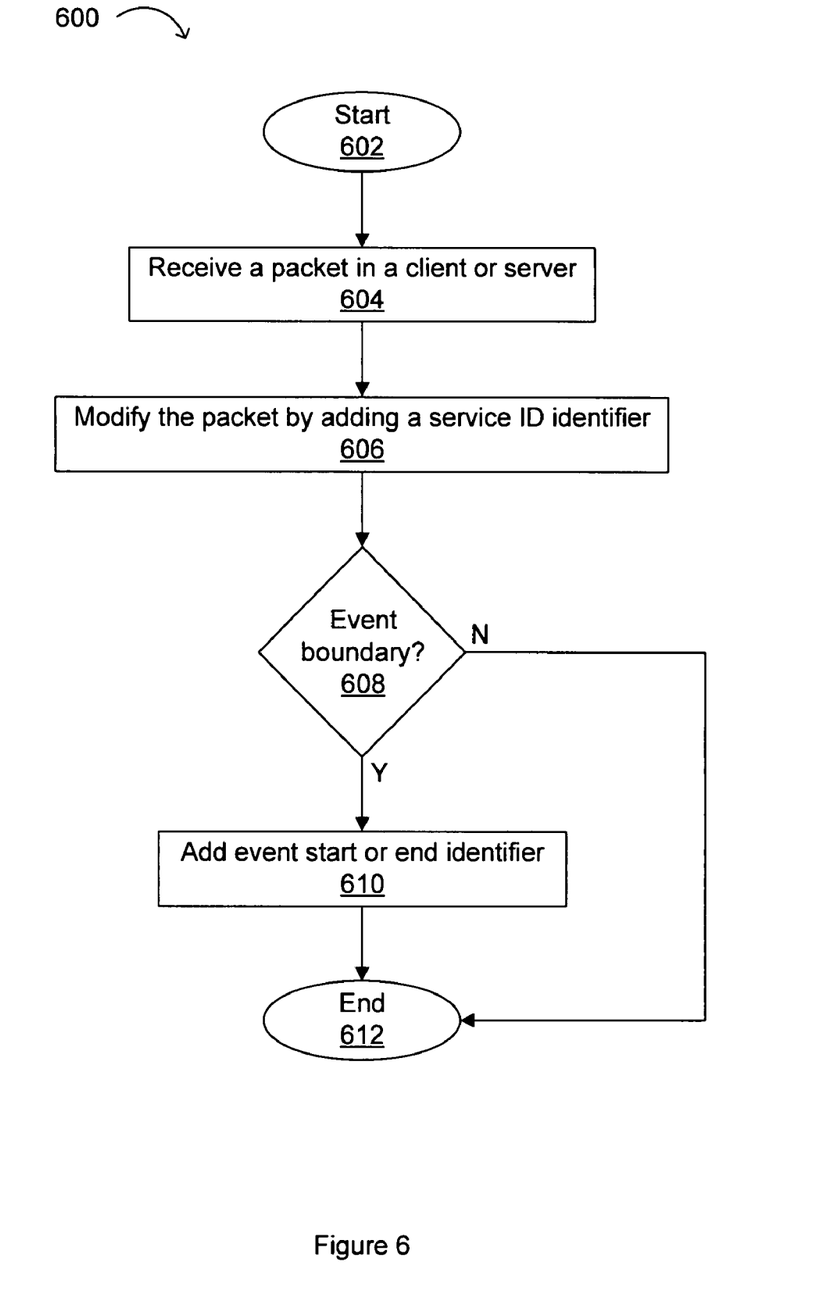
FIG. 6 illustrates a flow diagram of an example identifier insertion approach for differential processing.

Referring now to FIG. 6, a flow diagram of an example identifier insertion approach for differential processing is shown and indicated by the general reference character 600. The flow can begin (602), and a packet can be received in a client or a server (604). In particular embodiments, any suitable network device or tunnel endpoint can receive and modify the packet. The packet can be modified by inserting an identifier, such as a service ID (606). If the packet also represents an event boundary (608), an event start or end identifier can also be added to the packet (610). If the packet does not represent an event boundary (608), or after any event boundary identifier is added (610), the flow can complete (612).

Figure 7:
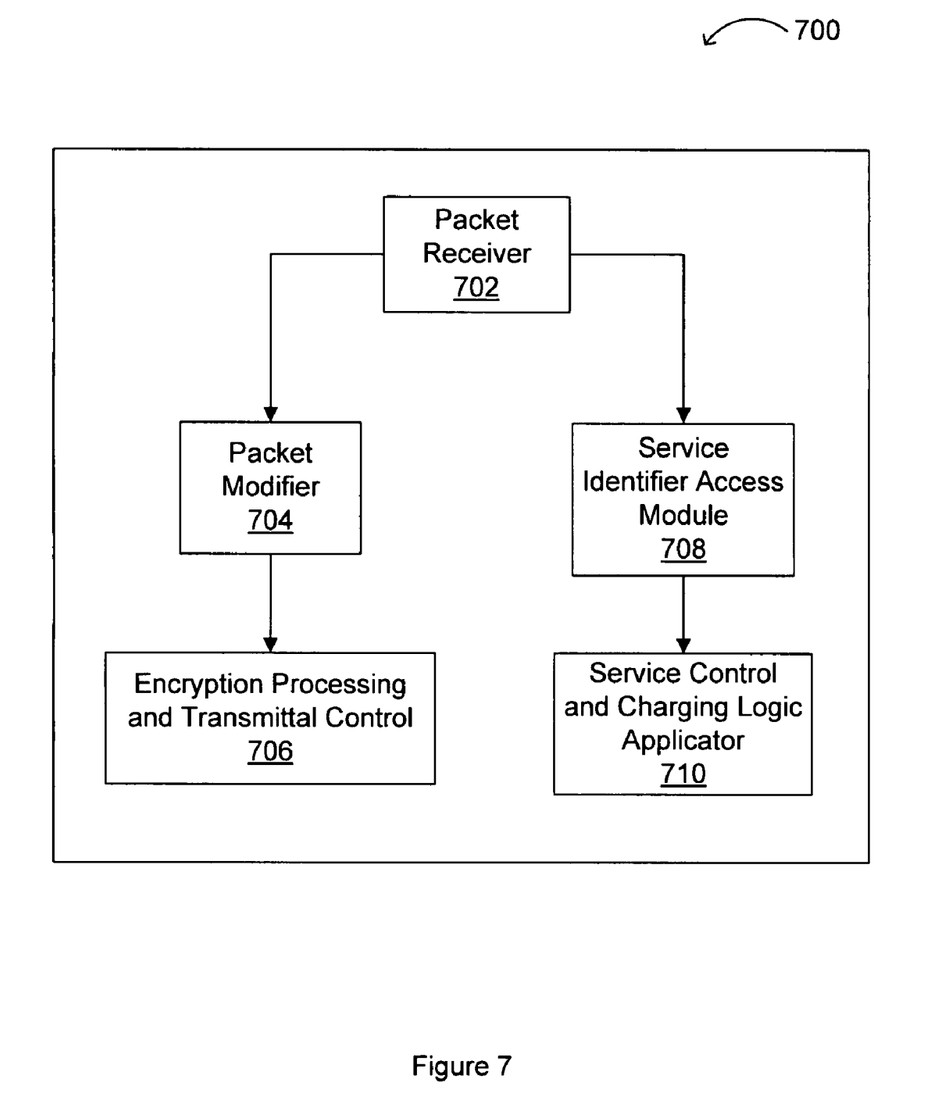
FIG. 7 illustrates example components of a network device.

Referring now to FIG. 7, example components of a network device are shown and indicated by the general reference character 700. The network device can include packet receiver 702, which can interface with packet modifier 704 for adding a service identifier to a cleartext portion of the packet header for an outbound packet. In addition, packet modifier 704 can add an event delimiter to the packet header when the outbound packet represents an event boundary. Then, the outbound packet may be passed to encryption processing and transmittal control 706 for packaging and transmitting across a tunnel.

Also in FIG. 7, packet receiver 702 of the network device can receive an encrypted packet with a packet header, and then pass to service identifier access module 708, which can access an unencrypted service identifier in the packet header. Service control and charging logic applicator 710 can then apply service control and charging logic to the packet using the unencrypted service identifier.

Although the description has been described with respect to particular embodiments thereof, these particular embodiments are merely illustrative, and not restrictive. For example, while IPsec encryption has been described in the examples above, other types of encryption and/or tunneling can be utilized in particular embodiments. Also, while particular network examples have been described, other types of networks and/or system arrangements can be utilized in particular embodiments. For example, networks suitable for use in particular embodiments can include GPRS, UMTS, CDMA, circuit switched dial, WLAN, and WiMAX.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer readable medium can be, by way of example only but not by limitation, an electronic, optical, a semiconductor system, apparatus, system, device, or computer memory.

Particular embodiments can be implemented in the form of control logic in software or hardware or a combination of both hardware and software. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
    receiving an outbound packet in a network device, the outbound packet having a packet header;
    modifying the outbound packet, using the network device, by adding a service identifier to a cleartext portion of the packet header, wherein the service identifier identifies a particular service with which the outbound packet is involved;
    identifying that the outbound packet corresponds to a boundary of a transaction involving the particular service;
    adding an event delimiter to the cleartext portion of the packet header, based at least in part on the identification that the outbound packet corresponds to a boundary of the transaction involving the particular service; and
    passing the outbound packet to an encryption process for packaging and transmitting across a tunnel, wherein the event delimiter and the service identifier are not encrypted allowing for exposure of the event delimiter and the service identifier to a network-based control device for differential processing of the outbound packet based on the involvement of the outbound packet with the particular service as defined by the service identifier and the event boundary, wherein differential processing includes applying service-specific charging rules to at least the outbound packet.

2. The method of claim 1, wherein the network-based control device uses the service identifier to enforce a policy of a service provider corresponding to the particular service.

3. The method of claim 1, wherein the particular service is bounded for charging purposes by the event delimiter.

4. A method, comprising:
    receiving a packet in a network device, the packet including an encrypted portion and a cleartext portion, wherein the cleartext portion is included in a packet header of the packet;
    accessing a service identifier from the cleartext portion of the packet header, wherein the service identifier identifies a particular service to which the received packet is involved;
    accessing an event delimiter from the cleartext portion of the packet header, the event delimiter identifying that the received packet represents a boundary of a transaction involving the particular service; and
    applying service control and charging logic to the received packet corresponding to the particular service identified in the service identifier, wherein the particular service is bounded for charging purposes by the event delimiter and the service identifier is used in the routing of the received packet to a corresponding service module and further used in providing quality of service specific to the identified particular service.

5. The method of claim 4, wherein the event delimiter represents a beginning or ending of a service event.

6. The method of claim 5, further comprising using, by a service provider, the event delimiter to charge a predetermined rate for the service event.

7. An apparatus, comprising:
    one or more processors; and
    logic encoded in one or more non-transitory computer readable media for execution by the one or more processors, and when executed being operable to perform:
        receiving a packet, wherein the packet is encrypted and the packet includes a packet header with a cleartext portion;
        accessing a service identifier from the cleartext portion of the packet header, wherein the service identifier identifies a particular service to which the received packet is involved;
        accessing an event delimiter from the cleartext portion of the packet header, the event delimiter identifying that the received packet represents a boundary of a transaction involving the particular service; and
        applying service control and charging logic to the received packet corresponding to the particular service identified in the service identifier, wherein the particular service is bounded for charging purposes by the event delimiter and the service identifier is used in the routing of the received packet to a corresponding service module and further used in providing quality of service specific to the identified particular service.

8. The apparatus of claim 7, wherein the packet is received from a virtual private network (VPN) tunnel.

9. The apparatus of claim 7, wherein the event delimiter represents a beginning or ending of a service event.

10. The apparatus of claim 9, wherein logic when executed is further operable to perform using, by a service provider, the event delimiter to charge a predetermined rate for the service event corresponding to the particular service.

11. An apparatus, comprising:
one or more processors; and
logic encoded in one or more non-transitory computer readable media for execution by the one or more processors, and when executed being operable to perform:
receiving an outbound packet in a network device, the outbound packet having a packet header;
modifying the outbound packet by adding a service identifier to a cleartext portion of the packet header, wherein the service identifier identifies a particular service with which the outbound packet is involved;
identifying that the outbound packet corresponds to a boundary of a transaction involving the particular service;
adding an event delimiter to the cleartext portion of the packet header, based at least in part on the identification that the outbound packet corresponds to a boundary of the transaction involving the particular service; and
passing the outbound packet to an encryption process for packaging and transmitting across a tunnel, wherein the event delimiter and the service identifier are not encrypted allowing for exposure of the event delimiter and the service identifier to a network-based control device for differential processing of the outbound packet based on the involvement of the outbound packet with the particular service as defined by the service identifier and the event boundary, wherein differential processing includes applying service-specific charging rules to at least the outbound packet.

12. The apparatus of claim 11, wherein the network-based control device uses the service identifier to enforce a policy of a service provider corresponding to the particular service.

13. The apparatus of claim 11, wherein the particular service is bounded for charging purposes by the event delimiter.

14. The method of claim 1, wherein the transaction is a particular transaction involving the particular service, the outbound packet is a particular one of a plurality of packets included in a data flow involving the particular transaction, and the method further comprises:
receiving a second outbound packet included in the data flow;
modifying the second outbound packet, using the network device, by adding the service identifier, corresponding to the particular service, to a cleartext portion of a packet header of the second outbound packet;
identifying that the second outbound packet does not correspond to a boundary of the particular transaction; and
passing the outbound packet to an encryption process for packaging and transmitting across a tunnel, wherein the service identifier is not encrypted allowing for exposure of the service identifier of the header of the second outbound packet to a network-based control device for differential processing of the second outbound packet based on the involvement of the outbound packet with the particular service as defined by the service identifier, wherein differential processing includes applying a service-specific policy to at least the second outbound packet.

15. The method of claim 1, wherein the particular service is at least one of a particular instant messaging, IPsec, peer-to-peer file sharing, video streaming, and video chat service.

* * * * *